US012747685B2

(12) United States Patent
Sasaki

(10) Patent No.: US 12,747,685 B2
(45) Date of Patent: Sep. 29, 2026

(54) DESULFURIZATION METHOD

(71) Applicant: SUBARU CORPORATION, Tokyo (JP)

(72) Inventor: Masanori Sasaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 19/020,170

(22) Filed: Jan. 14, 2025

(65) Prior Publication Data

US 2025/0290439 A1 Sep. 18, 2025

(30) Foreign Application Priority Data

Mar. 15, 2024 (JP) ................................ 2024-041758

(51) Int. Cl.

| | |
|---|---|
| ***F01N 3/20*** | (2006.01) |
| ***F01N 3/08*** | (2006.01) |
| ***F01N 9/00*** | (2006.01) |
| ***F01N 13/00*** | (2010.01) |

(52) U.S. Cl.

CPC ......... *F01N 3/2066* (2013.01); *F01N 3/0814* (2013.01); *F01N 3/0842* (2013.01); *F01N 3/0885* (2013.01); *F01N 9/00* (2013.01); *F01N 13/009* (2014.06); *F01N 2900/08* (2013.01); *F01N 2900/1602* (2013.01); *F01N 2900/1612* (2013.01); *Y02A 50/20* (2018.01)

(58) Field of Classification Search

CPC ............... F01N 3/2066; F01N 2900/08; F01N 2900/1602; F01N 2900/1612; F01N 3/0814; F01N 3/0842; F01N 3/0885; F01N 9/00; F01N 13/009

See application file for complete search history.

(56) References Cited

U.S. PATENT DOCUMENTS

| | | | | |
|---|---|---|---|---|
| 5,150,678 | A * | 9/1992 | Wittmann ................. | F02D 9/06 123/321 |
| 6,199,372 | B1 * | 3/2001 | Wakamoto ......... | B01D 53/9495 60/303 |
| 2005/0119822 | A1 * | 6/2005 | Surnilla ................ | F01N 11/002 701/114 |
| 2014/0090362 | A1 * | 4/2014 | Eckhoff ................. | F02M 26/06 60/274 |
| 2018/0028975 | A1 * | 2/2018 | Nagaoka ................... | F01N 3/08 |

(Continued)

FOREIGN PATENT DOCUMENTS

| | | | |
|---|---|---|---|
| JP | 2003-120268 | A | 4/2003 |
| JP | 2006336501 | A * | 12/2006 |
| JP | 2007009810 | A * | 1/2007 |

*Primary Examiner* — Matthew T Largi

(74) *Attorney, Agent, or Firm* — TROUTMAN PEPPER LOCKE LLP

(57) ABSTRACT

A desulfurization method includes: operating an engine to warm up an NOx storage-reduction catalyst provided in an exhaust passage coupled to the engine; controlling the engine so that an excess air ratio of the engine becomes a target value that is lower than 1 when a temperature of the NOx storage-reduction catalyst reaches a temperature at which the NOx storage-reduction catalyst is capable of reducing sulfur components stored in the NOx storage-reduction catalyst; stopping the engine; and closing the exhaust passage at a downstream side of the NOx storage-reduction catalyst.

10 Claims, 3 Drawing Sheets

(56) References Cited

U.S. PATENT DOCUMENTS

| | | | | |
|---|---|---|---|---|
| 2018/0266291 | A1* | 9/2018 | Suzuki | F01N 3/208 |
| 2021/0355890 | A1* | 11/2021 | Sato | F01N 3/101 |
| 2022/0112857 | A1* | 4/2022 | Kasuya | F02D 41/1475 |
| 2022/0290596 | A1* | 9/2022 | Fried | F01N 9/00 |

* cited by examiner

DESULFURIZATION METHOD

CROSS-REFERENCE TO RELATED APPLICATION

The present application claims priority from Japanese Patent Application No. 2024-041758 filed on Mar. 15, 2024, the entire contents of which are hereby incorporated by reference.

BACKGROUND

The present disclosure relates to a desulfurization method.

An NOx storage-reduction catalyst that removes nitrogen oxides (NOx) included in exhaust gas may be provided in an exhaust device of an engine mounted on a vehicle such as an automobile. The NOx storage-reduction catalyst removes NOx from exhaust gas by storing NOx while the air-fuel ratio of the engine is lean. Then, NOx is removed from the NOx storage-reduction catalyst by performing an NOx removal process at a predetermined timing. The NOx removal process is a process for desorbing NOx from the NOx storage-reduction catalyst and reducing NOx by making the air-fuel ratio of the engine lower (richer) than a theoretical air-fuel ratio when the temperature of the NOx storage-reduction catalyst is higher than or equal to the desorption temperature of NOX. The desorption temperature of NOx is, for example, higher than or equal to 250° C.

The NOx storage-reduction catalyst not only stores NOx in exhaust gas but also unintendedly stores sulfur components included in fuel or lubricant. Sulfur components cannot be removed from the NOx storage-reduction catalyst even when the NOx removal process described above is performed. Therefore, as the driving time of the engine elapses, sulfur components gradually accumulate in the NOx storage-reduction catalyst. When the accumulated amount of sulfur components increases in the NOx storage-reduction catalyst, the amount of NOx that can be stored decreases.

For example, Japanese Unexamined Patent Application Publication (JP-A) No. 2003-120268 discloses performing a sulfur removal process for making the air-fuel ratio of the engine rich if the temperature of the NOx storage-reduction catalyst reaches the desorption temperature of sulfur oxides when a vehicle is traveling and driven at a high load.

SUMMARY

An aspect of the disclosure provides a desulfurization method including: operating an engine to warm up an NOx storage-reduction catalyst provided in an exhaust passage coupled to the engine; controlling the engine so that an excess air ratio of the engine becomes a target value that is lower than 1 when a temperature of the NOx storage-reduction catalyst reaches a temperature at which the NOx storage-reduction catalyst is capable of reducing sulfur components stored in the NOx storage-reduction catalyst; stopping the engine; and closing the exhaust passage at a downstream side of the NOx storage-reduction catalyst.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

With the technology described in JP-A No. 2003-120268, hydrocarbon (HC) and carbon monoxide (CO) included in exhaust gas may flow to the outside.

It is desirable to provide a desulfurization method that can suppress flowing of hydrocarbon and carbon monoxide to the outside.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
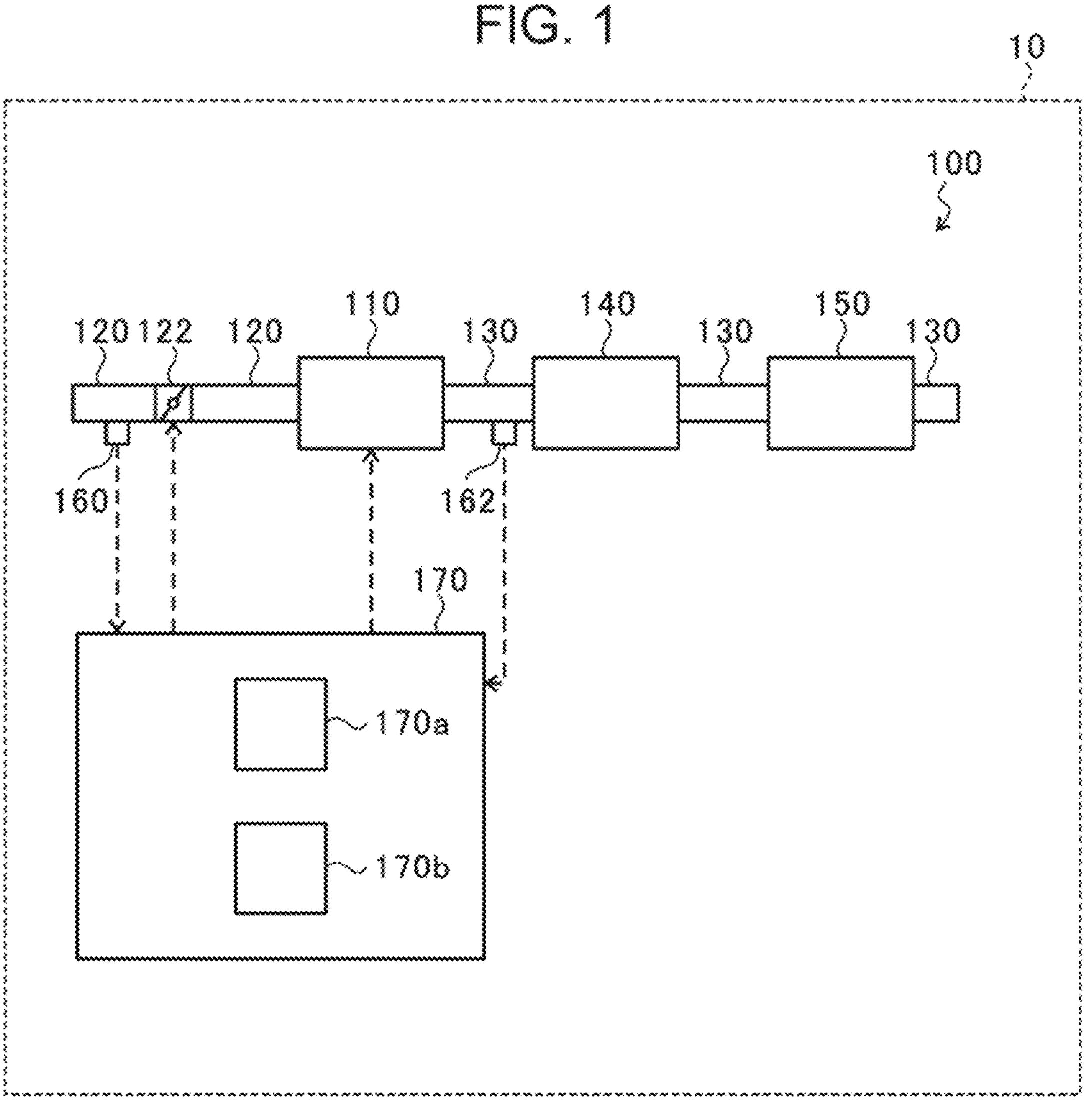
FIG. 1 is a schematic view illustrating the configuration of an engine system according to an embodiment of the disclosure.
Figure 2:
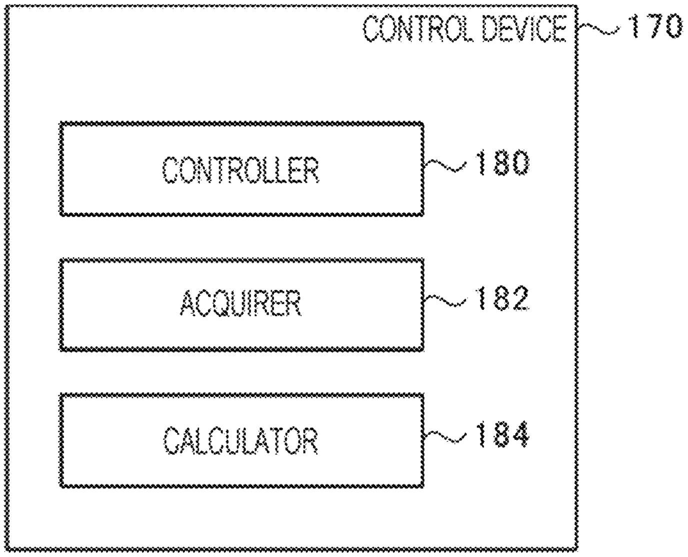
FIG. 2 is a block diagram illustrating an example of the functional configuration of a control device according to the embodiment of the disclosure.

Referring to FIGS. 1 and 2, an engine system 100 according to an embodiment of the disclosure will be described.

FIG. 1 is a schematic view illustrating the configuration of the engine system 100 according to the embodiment of the disclosure. In FIG. 1, broken-line arrows indicate flow of signals.

As illustrated in FIG. 1, the engine system 100 is mounted, for example, in a vehicle 10. The engine system 100 includes an engine 110, an intake passage 120, a throttle valve 122, an exhaust passage 130, an NOx storage-reduction catalyst 140, a muffler 150, an intake air amount sensor 160, a temperature sensor 162, and a control device 170.

The engine 110 serves as a power source of the vehicle 10. That is, the vehicle 10 is an engine vehicle. The engine 110 is a gasoline engine or a diesel engine. The vehicle 10 may be a hybrid vehicle including a motor, in addition to the engine 110, as a power source.

The intake passage 120 is coupled to the engine 110. For example, an intake manifold communicates with an intake port of the engine 110. The intake passage 120 communicates with a juncture of the intake manifold. The intake passage 120 is configured as, for example, a pipe. The throttle valve 122 is provided in the intake passage 120.

The exhaust passage 130 is coupled to the engine 110. For example, an exhaust manifold communicates with an exhaust port of the engine 110. The exhaust passage 130 communicates with a juncture of the exhaust manifold. The exhaust passage 130 is configured as, for example, a pipe. Exhaust gas discharged from the engine 110 flows through the exhaust passage 130. Hereafter, upstream in the flow direction of exhaust gas may be simply referred to as "upstream". Downstream in the flow direction of exhaust gas may be simply referred to as "downstream".

In the exhaust passage 130, the NOx storage-reduction catalyst 140 and the muffler 150 are provided in order of proximity to the engine 110.

The NOx storage-reduction catalyst (LNT: Lean NOx Trap) 140 includes, for example, barium (Ba) and potassium (K). The NOx storage-reduction catalyst 140 may further include a three-way catalyst. The three-way catalyst includes, for example, platinum (Pt), palladium (Pd), rhodium (Rh), and an OSC material. The OSC material is, for example, ceria.

The NOx storage-reduction catalyst 140 stores nitrogen oxides while the engine 110 is operating in a lean-burn mode. Hereafter, nitrogen oxides may be referred to as "NOx". The lean-burn mode is an operation mode in which the air-fuel ratio of the engine 110 is higher than (leaner than) a theoretical air-fuel ratio. Exhaust gas purified by the NOx storage-reduction catalyst 140 is discharged through the muffler 150.

The intake air amount sensor 160 is provided on the upstream side of the throttle valve 122 in the intake passage 120. The intake air amount sensor 160 detects the amount of air that flows into the engine 110.

The temperature sensor 162 is provided between the engine 110 and the NOx storage-reduction catalyst 140 in the exhaust passage 130. That is, the temperature sensor 162 is provided on the upstream side of the NOx storage-reduction catalyst 140 in the exhaust passage 130. The temperature sensor 162 detects the temperature of exhaust gas sent to the NOx storage-reduction catalyst 140. The temperature detected by the temperature sensor 162 can be regarded as the temperature of the NOx storage-reduction catalyst 140.

The control device 170 includes one or more processors 170*a* and one or more memories 170*b* coupled to the processor 170*a*. The processors 170*a* include, for example, a CPU (Central Processing Unit). The memories 170*b* include, for example, a ROM (Read Only Memory), a RAM (Random Access Memory), and the like. A ROM is a storage device that stores programs, calculation parameters, and the like that the CPU uses. A RAM is a storage device that temporarily stores variables, parameters, and the like that are used in processes executed by the CPU.

The control device 170 performs communication with devices provided in the vehicle 10, such as the engine 110, the throttle valve 122, the intake air amount sensor 160, the temperature sensor 162, and the like. Communication between the control device 170 and the devices is realized by using, for example, a CAN (Controller Area Network).

FIG. 2 is a block diagram illustrating an example of the functional configuration of the control device 170 according to an embodiment of the disclosure. For example, as illustrated in FIG. 2, the control device 170 includes a controller 180, an acquirer 182, and a calculator 184.

Various processes including processes described below, which are performed by the controller 180, the acquirer 182, and the calculator 184, can be executed by the processor 170*a*. In detail, various processes are performed as the processor 170*a* executes programs stored in the memory 170*b*.

The function of the control device 170 according to the present embodiment may be shared among multiple devices, or multiple functions may be realized by one device. When the function of the control device 170 is shared among multiple devices, the multiple devices may be coupled to each other via a communication bus such as a CAN.

The controller 180 controls the operations of devices in the engine system 100. For example, the controller 180 controls the engine 110 and the throttle valve 122.

The controller 180 controls the air-fuel ratio of the engine 110 by controlling, for example, the amount of fuel injected into the combustion chamber of the engine 110 and the opening degree of the throttle valve 122. In the present embodiment, the controller 180 performs a lean-burn process, an NOx removal process, and a sulfur removal process. The lean-burn process and the NOx removal process are performed, for example, while the vehicle 10 is traveling. The sulfur removal process is performed, for example, while the vehicle 10 is stopped.

The lean-burn process is a process for setting the operation mode of the engine 110 to a lean-burn mode. In the lean-burn process, the air-fuel ratio of the engine 110 is made leaner than a theoretical air-fuel ratio, that is, the excess air ratio of the engine 110 is made higher than 1 ($\lambda>1$). $\lambda$ denotes the excess air ratio. Exhaust gas includes NOx while the lean-burn process is performed, and the NOx included in exhaust gas is stored into the NOx storage-reduction catalyst 140. As the time during which the lean-burn process is performed increases, the amount of NOx stored into the NOx storage-reduction catalyst 140 increases.

When the amount of NOx stored in the NOx storage-reduction catalyst 140 exceeds a predetermined amount, the controller 180 performs the NOx removal process. The predetermined amount is determined, for example, based on the maximum amount of NOx that can be stored by the NOx storage-reduction catalyst 140. The predetermined amount is slightly smaller than the maximum amount of NOx that can be stored by the NOx storage-reduction catalyst 140. For example, the predetermined amount is the product of a predetermined ratio and the maximum amount of NOx that can be stored by the NOx storage-reduction catalyst 140.

The NOx removal process is a process for removing NOx from the NOx storage-reduction catalyst 140. In the NOx removal process, the temperature of the NOx storage-reduction catalyst 140 is set to the desorption temperature of NOx, and the operation mode of the engine 110 is set to a rich-burn mode. The rich-burn mode is an operation mode in which the air-fuel ratio of the engine 110 is richer than a theoretical air-fuel ratio, that is, the excess air ratio of the engine 110 is lower than 1 ($\lambda<1$). The desorption temperature of NOx is a temperature at which the NOx storage-reduction catalyst 140 is capable of desorbing NOx and is capable of reducing NOx. The desorption temperature of NOx is, for example, higher than or equal to 250° C.

The sulfur removal process is a process for removing sulfur oxides from the NOx storage-reduction catalyst 140. In the sulfur removal process, the temperature of the NOx storage-reduction catalyst 140 is set to the desorption temperature of sulfur components, and the operation mode of the engine 110 is set to a rich-burn mode. The desorption temperature of sulfur components is a temperature at which the NOx storage-reduction catalyst 140 is capable of desorbing sulfur components and is capable of reducing sulfur components. The desorption temperature of sulfur components is higher than the desorption temperature of NOx. The desorption temperature of sulfur components is, for example, higher than or equal to 550° C. The sulfur components are, for example, sulfur oxides (SOx). The sulfur removal process will be described below in detail.

The acquirer 182 acquires various information to be used in the processes performed by the controller 180 and the calculator 184 and outputs the information to the controller 180 and the calculator 184. For example, the acquirer 182 acquires information from the engine 110, the intake air amount sensor 160, and the temperature sensor 162.

The calculator 184 calculates the amount of NOx stored in the NOx storage-reduction catalyst 140 and the amount of sulfur components stored in the NOx storage-reduction catalyst 140. The amount of NOx and the amount of sulfur components calculated by the calculator 184 are stored, for example, in the memory **170*b***. Hereafter, the amount of NOx may be referred to as "NOx amount", and the amount of sulfur components may be referred to as "sulfur component amount".

For example, while the controller 180 is performing the lean-burn process, the calculator 184 calculates the NOx amount stored in the NOx storage-reduction catalyst 140 at each unit time interval. The calculator 184 updates the NOx amount stored in the memory **170*b* at each unit time interval by adding the calculated NOx amount to the NOx amount stored in the memory 170*b*. When the NOx removal process or the sulfur removal process is finished, the calculator 184 resets the NOx amount stored in the memory 170*b* to zero. Moreover, when driving of the engine 110 is restarted after the NOx removal process is finished or the sulfur removal process is finished, the calculator 184** restarts the calculation of the NOx amount.

The calculator 184 calculates the amount of NOx stored in the NOx storage-reduction catalyst 140 per unit time based on, for example, the flow rate of exhaust gas sent to the NOx storage-reduction catalyst 140 and the concentration of NOx included in exhaust gas. The calculator 184 may acquire the concentration of NOx sent to the NOx storage-reduction catalyst 140 based on a detection value of an NOx sensor (not shown). The NOx sensor is provided, for example, between the engine 110 and the NOx storage-reduction catalyst 140 in the exhaust passage 130. The NOx sensor is a sensor that detects the concentration of NOx. The concentration of NOx sent to the NOx storage-reduction catalyst 140 may be estimated based on the rotation speed of the engine 110, the detection amount of the intake air amount sensor 160, the excess air ratio, and the ignition timing.

For example, the calculator 184 calculates the sulfur component amount stored in the NOx storage-reduction catalyst 140 at each unit time interval. The calculator 184 updates the sulfur component amount stored in the memory **170*b* at each unit time interval by adding the calculated sulfur component amount to the sulfur component amount stored in the memory 170*b*. When the sulfur removal process is finished, the calculator 184 resets the sulfur component amount stored in the memory 170*b* to zero. Moreover, when driving of the engine 110 is restarted after the sulfur removal process is finished, the calculator 184** restarts the calculation of the sulfur component amount.

The calculator 184 calculates the amount of sulfur components stored in the NOx storage-reduction catalyst 140 per unit time based on, for example, the flow rate of exhaust gas sent to the NOx storage-reduction catalyst 140 and the concentration of sulfur components included in exhaust gas. The calculator 184 may acquire the concentration of sulfur components sent to the NOx storage-reduction catalyst 140 based on a detection value of a sulfur sensor (not shown). The sulfur sensor is provided, for example, between the engine 110 and the NOx storage-reduction catalyst 140 in the exhaust passage 130. The sulfur sensor is a sensor that detects, for example, the concentration of SOx. The concentration of sulfur components sent to the NOx storage-reduction catalyst 140 may be estimated based on the rotation speed of the engine 110, the detection amount of the intake air amount sensor 160, the excess air ratio, and the ignition timing.

When the controller 180 performs the NOx removal process, the calculator 184 refers to the NOx amount stored in the memory **170*b* and calculates the amount of a reducing agent that can reduce NOx stored in the NOx storage-reduction catalyst 140. In the NOx removal process, the controller 180 causes fuel to be injected into the engine with an amount that is necessary to supply the amount of the reducing agent calculated by the calculator 184 to the NOx storage-reduction catalyst 140. The reducing agent is hydrocarbon and carbon monoxide derived from fuel and included in exhaust gas discharged from the engine 110**.

Moreover, the calculator 184 calculates a target value of the excess air ratio based on the amount of sulfur components stored in the NOx storage-reduction catalyst 140.

Next, referring to FIG. 3, a desulfurization method according to an embodiment of the disclosure will be described.

Figure 3:
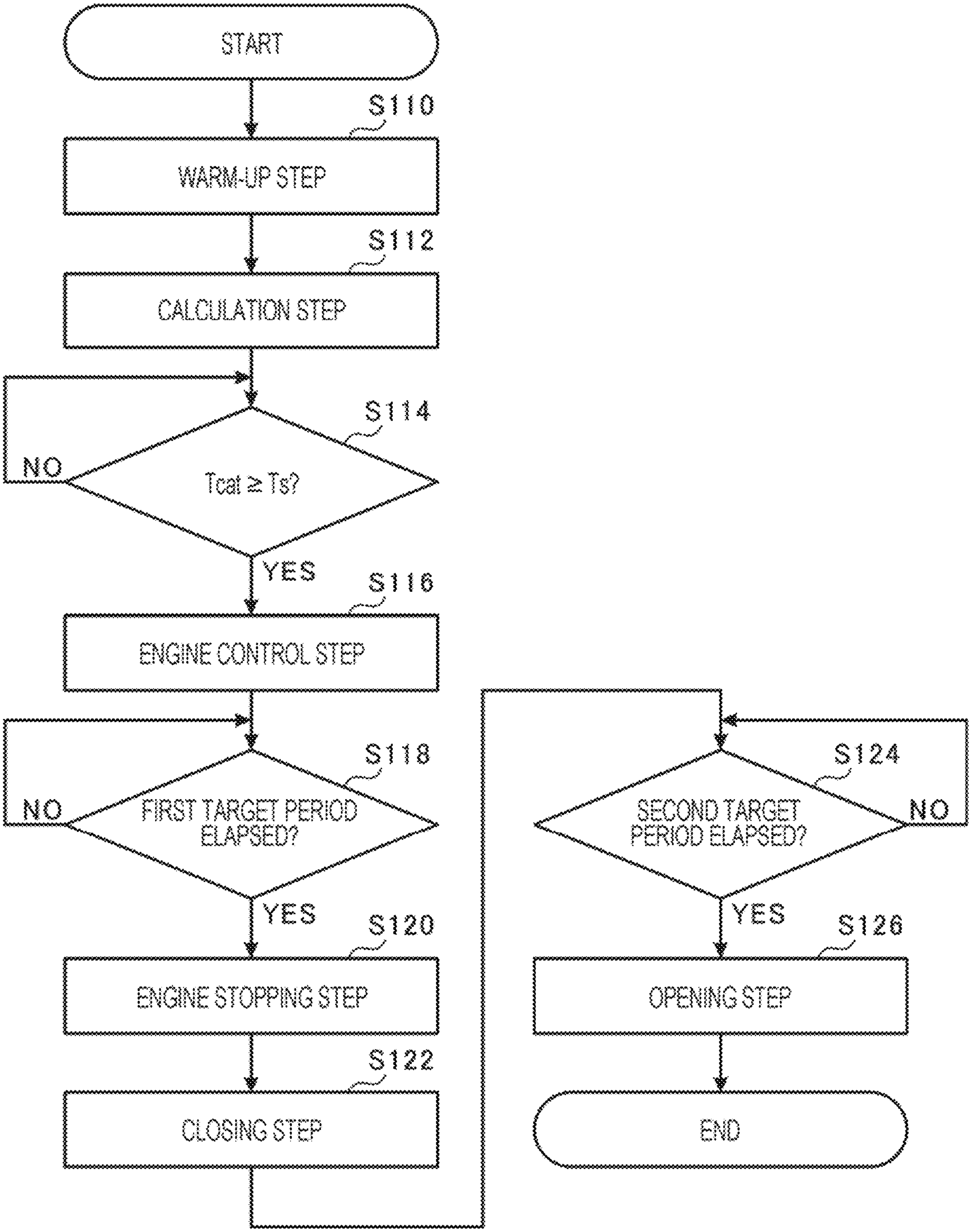
FIG. 3 is a flowchart illustrating an example of the process flow of a desulfurization method according to the embodiment of the disclosure.

FIG. 3 is a flowchart illustrating an example of the process flow of the desulfurization method according to the embodiment of the disclosure. The desulfurization method according to the present embodiment is performed, for example, while the vehicle 10 is stopped. The desulfurization method according to the present embodiment is performed, for example, in a facility for performing inspection, repair, maintenance, or the like of the vehicle 10. The process flow illustrated in FIG. 3 is started, for example, in response to a predetermined operational input by an operator of the facility.

As illustrated in FIG. 3, the desulfurization method according to the present embodiment includes a warm-up step S110, a calculation step S112, a temperature determining step S114, an engine control step S116, a first period determining step S118, an engine stopping step S120, a closing step S122, a second period determining step S124, and an opening step S126. In the present embodiment, the process from the warm-up step S110 to the engine stopping step S120 correspond to the sulfur removal process performed by the engine system 100. Hereafter, each step will be described.

In the warm-up step S110, the controller 180 operates the engine 110 to warm up the NOx storage-reduction catalyst 140 provided in the exhaust passage 130 coupled to the engine 110. In the present embodiment, the controller 180, for example, warms up the NOx storage-reduction catalyst 140 in a state in which the engine 110 is controlled so that the excess air ratio of the engine 110 becomes 1. That is, the controller 180 controls the engine 110 so that the air-fuel ratio of the engine 110 becomes a theoretical air-fuel ratio. For example, the controller 180 adjusts the amount of fuel injected into the engine 110, the rotation speed of the engine 110, the ignition timing of the engine 110, and the like so that the air-fuel ratio of the engine 110 becomes the theoretical air-fuel ratio and the temperature of the NOx storage-reduction catalyst 140 increases to the desorption temperature Ts of sulfur components.

In the engine control step S116 described below, sulfur components are removed from the NOx storage-reduction catalyst 140 by causing the engine 110 to operate in a rich-burn mode. In the calculation step S112, the calculator 184 calculates a target value of the excess air ratio based on the amount of sulfur components stored in the NOx storage-reduction catalyst 140. For example, the calculator 184 refers to the sulfur component amount stored in the memory 170*b* and calculates the amount of a reducing agent that can reduce sulfur components stored in the NOx storage-reduction catalyst 140. Then, the calculator 184 calculates a target value of the excess air ratio with which it is possible to fill the exhaust passage 130 with the calculated amount of the reducing agent. At this time, the calculator 184 may consider, in addition to the amount of sulfur components stored in the NOx storage-reduction catalyst 140, the amount of oxygen stored in the NOx storage-reduction catalyst 140. In the calculation step S112, the excess air ratio calculated by the calculator 184 is lower than 1.

In the temperature determining step S114, the controller 180 determines whether the temperature Tcat of the NOx storage-reduction catalyst 140 is higher than or equal to the desorption temperature Ts of sulfur components. For example, the controller 180 regards the detection value of the temperature sensor 162 acquired by the acquirer 182 as the temperature Tcat of the NOx storage-reduction catalyst 140, and determines whether the detection value of the temperature sensor 162 is higher than or equal to the desorption temperature Ts. If the controller 180 determines that the temperature Tcat is higher than or equal to the desorption temperature Ts (YES in step S114), the controller 180 moves the process to the engine control step S116. On the other hand, if the controller 180 determines that the temperature Tcat is not higher than or equal to the desorption temperature Ts, that is, the temperature Tcat is lower than the desorption temperature Ts (NO in step S114), the controller 180 repeats the temperature determining step S114.

In the engine control step S116, the controller 180 controls the engine 110 so that the excess air ratio of the engine 110 becomes lower than 1. That is, in the engine control step S116, the controller 180 causes the engine 110 to operate in a rich-burn mode. In the present embodiment, the controller 180 adjusts the amount of fuel injected into the engine 110, the opening degree of the throttle valve 122, and the like so that the excess air ratio becomes the target value of the excess air ratio calculated in the calculation step S112

In the first period determining step S118, the controller 180 determines whether a first target period has elapsed since the engine control step S116 was started. The first target period is a period from the time when exhaust gas is discharged from the engine 110 to the time when the exhaust gas diffuses to the outlet of the exhaust passage 130. The first target period is, for example, longer than or equal to 5 seconds and shorter than or equal to 15 seconds. The outlet of the exhaust passage 130 is, for example, the outlet of the muffler 150. If the controller 180 determines that the first target period has elapsed (YES in step S118), the controller 180 moves the process to the engine stopping step S120. On the other hand, if the controller 180 determines that the first target period has not elapsed (NO in step S118), the controller 180 repeats the first period determining step S118.

In the engine stopping step S120, the controller 180 stops the engine 110.

In the closing step S122, the exhaust passage 130 at the downstream side of the NOx storage-reduction catalyst 140 is closed. For example, an operator of the facility closes the outlet of the exhaust passage 130 with a plug.

In the second period determining step S124, whether a second target period has elapsed since the closing step S122 was started is determined. The second target period is the period from the time when the closing step S122 was started to the time when sulfur components stored in the NOx storage-reduction catalyst 140 are removed by the reducing agent. If the controller 180 determines that the second target period has elapsed (YES in step S124), the controller 180 moves the process to the opening step S126. On the other hand, if the controller 180 determines that the second target period has not elapsed (NO in step S124), the controller 180 repeats the second period determining step S124.

In the opening step S126, the downstream side of the NOx storage-reduction catalyst 140 in the exhaust passage 130 is opened. For example, an operator of the facility removes the plug from the outlet of the exhaust passage 130.

When the opening step S126 is finished, the process flow illustrated in FIG. 3 is finished.

Advantageous effects of the desulfurization method according to the embodiment of the disclosure will be described.

The desulfurization method according to the present embodiment includes: operating the engine 110 to warm up the NOx storage-reduction catalyst 140 provided in the exhaust passage 130 coupled to the engine 110; controlling the engine 110 so that the excess air ratio of the engine 110 becomes a target value that is lower than 1 when the temperature of the NOx storage-reduction catalyst 140 reaches a temperature at which the NOx storage-reduction catalyst 140 is capable of reducing sulfur components stored in the NOx storage-reduction catalyst 140; stopping the engine 110; and closing the exhaust passage 130 at the downstream side of the NOx storage-reduction catalyst 140. Accordingly, the desulfurization method according to the present embodiment can send hydrocarbon and carbon monoxide that serve as the reducing agent to the NOx storage-reduction catalyst 140 by setting the excess air ratio of the engine 110 to be lower than 1 when the temperature of the NOx storage-reduction catalyst 140 reaches a temperature at which the NOx storage-reduction catalyst 140 is capable of reducing sulfur components. By stopping the engine 110 and closing the exhaust passage 130 at the downstream side of the NOx storage-reduction catalyst 140, it is possible to prevent flow of air into the exhaust passage 130 while filling the exhaust passage 130 with the reducing agent. Thus, it becomes possible to prevent decrease of efficiency in reducing sulfur components due to oxygen included in air. Moreover, by closing the exhaust passage 130 at the downstream side of the NOx storage-reduction catalyst 140, it is possible to avoid flowing of the reducing agent to the outside. Since flowing of the reducing agent to the outside can be prevented, it is possible to remove sulfur components stored in the NOx storage-reduction catalyst 140 by using a small amount of the reducing agent.

In the desulfurization method according to the present embodiment, the target value of the excess air ratio may be determined based on the amount of sulfur components stored in the NOx storage-reduction catalyst 140. Thus, the desulfurization method according to the present embodiment can remove sulfur components from the NOx storage-reduction catalyst 140.

In the desulfurization method according to the present embodiment, the warming up the NOx storage-reduction catalyst 140 may include warming up the NOx storage-reduction catalyst 140 in a state in which the engine 110 is controlled so that the excess air ratio of the engine 110 becomes 1. When the excess air ratio of the engine 110 is a theoretical air-fuel ratio that is 1, the temperature of exhaust gas is higher than that when the excess air ratio of the engine 110 is lower than 1 and rich. Therefore, by setting the excess air ratio of the engine 110 to 1, it is possible to warm up the NOx storage-reduction catalyst 140 earlier than when the engine 110 is operated in a rich-burn mode. Moreover, when the excess air ratio of the engine 110 is a theoretical air-fuel ratio that is 1, the amount of the reducing agent included in exhaust gas is smaller than that when the excess air ratio of the engine 110 is lower than 1 and rich. Therefore, by setting the excess air ratio of the engine 110 to 1, it is possible to suppress flowing of the reducing agent from the exhaust passage 130 to the outside than when the engine 110 is operated in a rich-burn mode.

In the present embodiment, the engine 110 may be provided in the vehicle 10, and the desulfurization method according to the present embodiment may be performed while the vehicle 10 is stopped. Thus, it is possible to remove sulfur components from the NOx storage-reduction catalyst 140 while avoiding malfunction in driving of the vehicle 10, decrease of fuel cost, and the like that may occur if the sulfur removal process is performed while the vehicle 10 is being driven.

In the calculation step S112 of the embodiment described above, an example in which the calculator 184 calculates the target value of the excess air ratio based on the amount of sulfur components stored in the NOx storage-reduction catalyst 140 has been described. However, the calculator 184 may calculate the excess air ratio based on, in addition to the amount of sulfur components stored in the NOx storage-reduction catalyst 140, for example, the amount of NOx stored in the NOx storage-reduction catalyst 140.

In a calculation step S112 according to a first modification, the calculator 184 refers to, for example, the NOx amount and the sulfur component amount stored in the memory 170*b* and calculates the amount of a reducing agent that can reduce NOx and sulfur components stored in the NOx storage-reduction catalyst 140. Then, the calculator 184 calculates the target value of the excess air ratio with which it is possible to fill the exhaust passage 130 with the calculated amount of the reducing agent. Also in the calculation step S112 according to the first modification, the excess air ratio calculated by the calculator 184 is lower than 1.

In the desulfurization method according to the first modification, the target value of the excess air ratio is determined based on, in addition to the amount of sulfur components stored in the NOx storage-reduction catalyst 140, the amount of nitrogen oxides stored in the NOx storage-reduction catalyst 140. Thus, when NOx remains in the NOx storage-reduction catalyst 140, it is possible to remove NOx in addition to sulfur components.

In the embodiment described above, the engine system 100, which does not include an on-off valve in the exhaust passage 130, has been described as an example. However, an engine system 200 may include an on-off valve in the exhaust passage 130.

Figure 4:
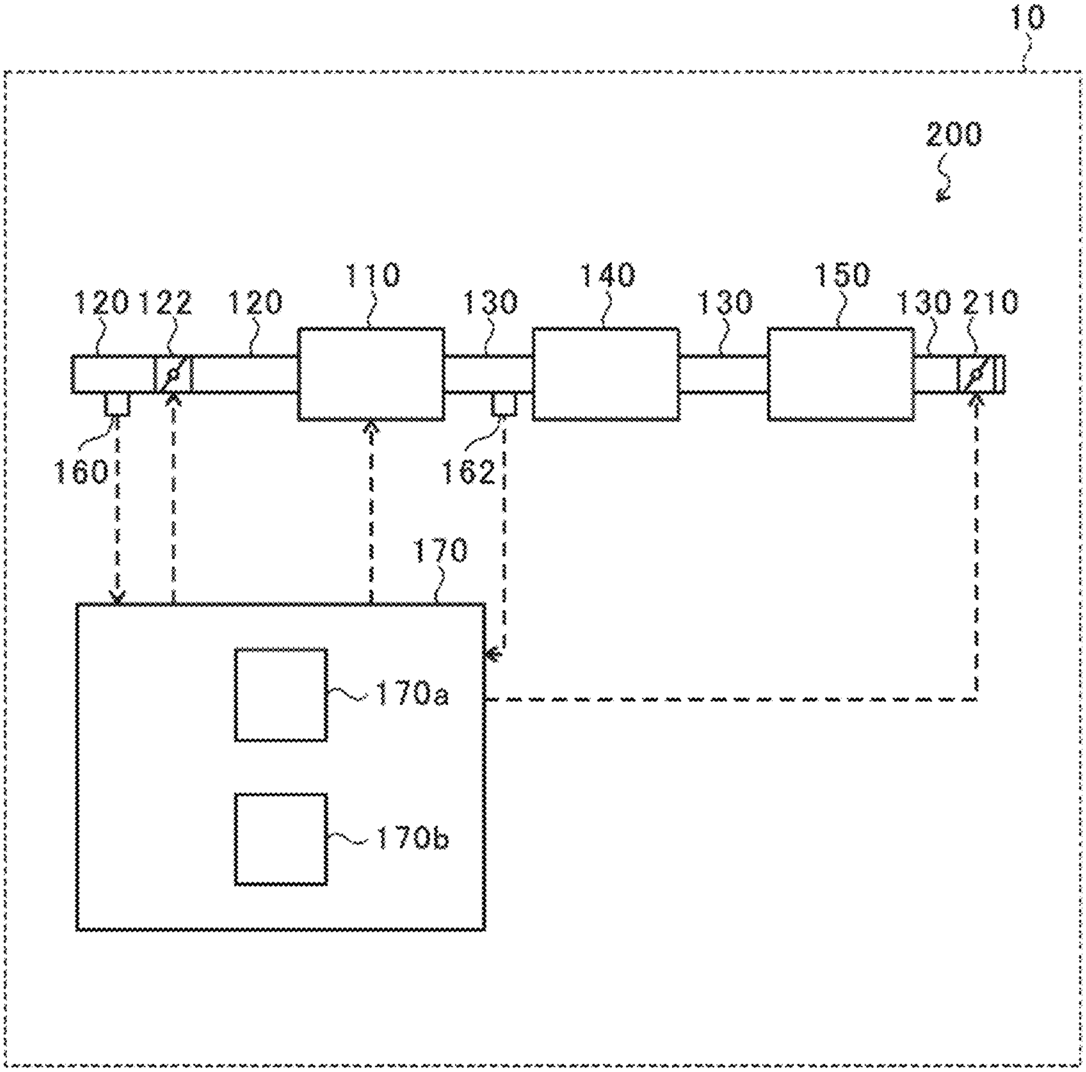
FIG. 4 is a schematic view illustrating the configuration of an engine system according to a modification.

FIG. 4 is a schematic view illustrating the configuration of the engine system 200 according to a second modification. In FIG. 4, broken-line arrows indicate flow of signals.

As illustrated in FIG. 4, the engine system 200 according to the second modification is mounted, for example, in the vehicle 10. The engine system 200 according to the second modification includes the engine 110, the intake passage 120, the throttle valve 122, the exhaust passage 130, the NOx storage-reduction catalyst 140, the muffler 150, the intake air amount sensor 160, the temperature sensor 162, the control device 170, and an on-off valve 210. Elements that are substantially the same as those of the engine system 100 will be denoted by the same numerals, and descriptions thereof will be omitted. The engine system 200 according to the second modification differs from the engine system 100 in the inclusion of the on-off valve 210 and in the control performed by the control device 170, and is the same as the engine system 100 in other respects.

As illustrated in FIG. 4, the on-off valve 210 is provided on the downstream side of the NOx storage-reduction catalyst 140 in the exhaust passage 130. The on-off valve 210 is provided, for example, at the outlet of the muffler 150 in the exhaust passage 130. The on-off valve 210 opens and closes the exhaust passage 130.

In the second modification, the controller 180 of the control device 170 controls opening and closing of the on-off valve 210. For example, the controller 180 opens the on-off valve 210 except when a desulfurization method is performed.

In the second modification, the controller 180 closes the on-off valve 210 in the closing step S122. Thus, the exhaust passage 130 at the downstream side of the NOx storage-reduction catalyst 140 is closed.

In the second modification, in the second period determining step S124, the controller 180 determines whether the second target period has elapsed since the closing step S122 was started. In the second modification, if the controller 180 determines that the second target period has elapsed (YES in step S124), the controller 180 moves the process to the opening step S126. On the other hand, if the controller 180 determines that the second target period has not elapsed (NO in step S124), the controller 180 repeats the second period determining step S124.

In the second modification, the controller 180 opens the on-off valve 210 in the opening step S126. Thus, the downstream side of the NOx storage-reduction catalyst 140 in the exhaust passage 130 is opened.

As described above, with the desulfurization method using the engine system 200 according to the second modification, in addition to the advantageous effects obtained by the desulfurization method according to the embodiment described above, it is possible to save time and labor of attaching and removing a plug by an operator of the facility.

The present disclosure is not limited to the embodiments that have been described with reference to the drawings. It is clear that a person having ordinary skill in the art can conceive of various modifications and corrections in the categories described in the claims, and it is to be understood that such modifications and corrections are included in the technical scope of the disclosure.

For example, the steps described by using the flowchart in the present specification need not be performed in the order illustrated in the flowchart. Additional steps may be adopted, and some steps may be omitted.

In the calculation step S112 of the embodiment described above, an example in which the target value of the excess air ratio is determined based on the amount of sulfur components stored in NOx storage-reduction catalyst has been described. However, it is sufficient that the target value of the excess air ratio determined in the calculation step S112 be lower than 1, and the amount of sulfur components stored in NOx storage-reduction catalyst need not be considered. For example, the calculation step S112 may be omitted, and, in the engine control step S116, the target value of the excess air ratio may be set to a fixed value that is lower than 1.

In the warm-up step S110 of the embodiment described above, an example in which the engine 110 is controlled so that the excess air ratio of the engine 110 becomes 1 has been described. However, in the warm-up step S110, as long as the NOx storage-reduction catalyst 140 can be warmed up by operating the engine, there is no limitation on the excess air ratio. For example, the NOx storage-reduction catalyst 140 may be warmed up by causing the engine 110 to operate in a lean-burn mode or a rich-burn mode.

In the embodiment described above, an example in which the desulfurization method is performed while the vehicle 10 is stopped has been described. However, the desulfurization method may be performed while the vehicle 10 is travelling.

For example, in the second modification, an example in which the on-off valve 210 is provided at the outlet of the muffler 150 in the exhaust passage 130 has been described. However, as long as the on-off valve 210 is provided on the downstream side of the NOx storage-reduction catalyst 140, the position of the on-off valve 210 is not limited. For example, the on-off valve 210 may be provided between the NOx storage-reduction catalyst 140 and the muffler 150 in the exhaust passage 130. For example, the on-off valve 210 may be provided in the muffler 150.

With the disclosure, it is possible to suppress flowing of hydrocarbon and carbon monoxide to the outside.

The invention claimed is:

1. A desulfurization method comprising:
- operating an engine to warm up an NOx storage-reduction catalyst provided in an exhaust passage coupled to the engine;
- controlling the engine so that an excess air ratio of the engine becomes a target value that is lower than 1 when a temperature of the NOx storage-reduction catalyst reaches a temperature at which the NOx storage-reduction catalyst is capable of reducing sulfur components stored in the NOx storage-reduction catalyst;
- stopping the engine after the excess air ratio of the engine is controlled to the target value;
- closing the exhaust passage at a downstream side of the NOx storage-reduction catalyst after stopping the engine; and
- maintaining the exhaust passage closed for a predetermined period such that the sulfur components stored in the NOx storage-reduction catalyst are removed while the engine is stopped.

2. The desulfurization method according to claim 1, wherein the target value of the excess air ratio is determined based on an amount of sulfur components stored in the NOx storage-reduction catalyst.

3. The desulfurization method according to claim 2, wherein the target value of the excess air ratio is determined based on, in addition to the amount of sulfur components stored in the NOx storage-reduction catalyst, an amount of nitrogen oxides stored in the NOx storage-reduction catalyst.

4. The desulfurization method according to claim 2, wherein the warming up the NOx storage-reduction catalyst comprises warming up the NOx storage-reduction catalyst in a state in which the engine is controlled so that the excess air ratio of the engine becomes 1.

5. The desulfurization method according to claim 2, wherein
- the engine is provided in a vehicle, and
- the desulfurization method is performed while the vehicle is stopped.

6. The desulfurization method according to claim 1, wherein the warming up the NOx storage-reduction catalyst comprises warming up the NOx storage-reduction catalyst in a state in which the engine is controlled so that the excess air ratio of the engine becomes 1.

7. The desulfurization method according to claim 1, wherein
- the engine is provided in a vehicle, and
- the desulfurization method is performed while the vehicle is stopped.

8. The desulfurization method according to claim 1, wherein an outlet of the exhaust passage is closed with a plug.

9. The desulfurization method according to claim 1, wherein closing the exhaust passage comprises closing an on-off valve provided on the downstream side of the NOx storage-reduction catalyst in the exhaust passage.

10. The desulfurization method according to claim 1, further comprising:
- opening the exhaust passage at the downstream side of the NOx storage-reduction catalyst after the predetermined period has elapsed.

* * * * *